Sept. 25, 1956  K. H. WALKOE  2,764,665
ELECTRIC HEATING APPLIANCES
Filed July 21, 1955  3 Sheets-Sheet 1

INVENTOR.
Kenneth H. Walkoe
BY
Smith, Olsen, Baird & Miller
Attys.

Sept. 25, 1956 K. H. WALKOE 2,764,665
ELECTRIC HEATING APPLIANCES
Filed July 21, 1955 3 Sheets-Sheet 2

INVENTOR.
Kenneth H. Walkoe
BY
Smith, Olsen, Baird & Miller
Attys.

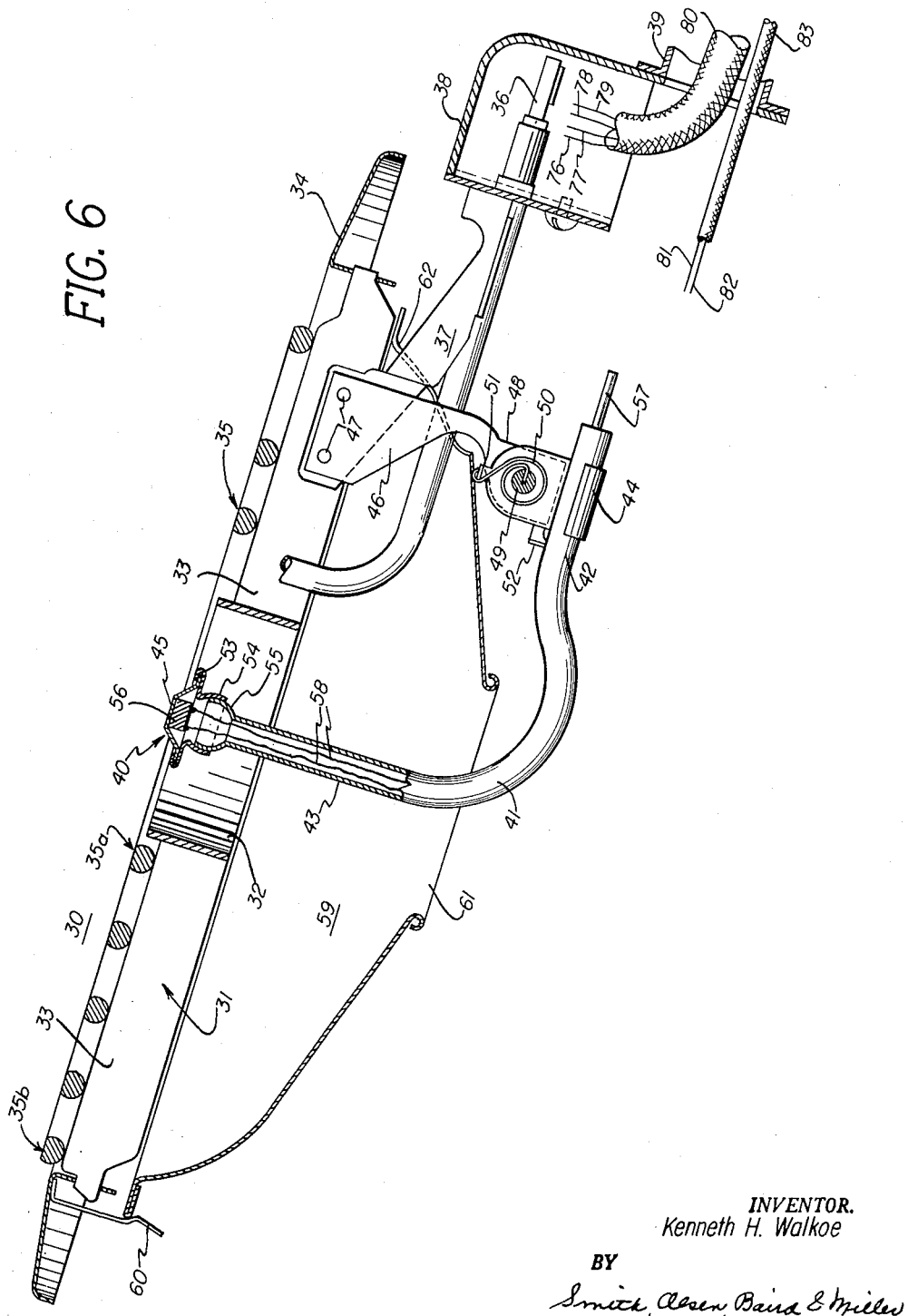
Sept. 25, 1956  K. H. WALKOE  2,764,665
ELECTRIC HEATING APPLIANCES
Filed July 21, 1955  3 Sheets-Sheet 3
INVENTOR.
Kenneth H. Walkoe
BY
Smith, Olsen, Baird & Miller
Attys.

_United States Patent Office_

2,764,665
Patented Sept. 25, 1956

2,764,665

ELECTRIC HEATING APPLIANCES

Kenneth H. Walkoe, Lombard, Ill., assignor to General Electric Company, a corporation of New York Application July 21, 1955, Serial No. 523,472

10 Claims. (Cl. 219—37)

The present invention relates to electric heating appliances and more particularly to a combination deep-well and surface-unit cooking appliance for an electric range and comprising a part of an automatic cooking system that may be selectively controlled to carry out an automatic cooking operation when the cooking appliance occupies either its deep-well cooking position or its surface-unit cooking position.

It is a general object of the invention to provide in an automatic cooking system, a combination deep-well and surface-unit cooking appliance and comprising a heating unit selectively movable between a deep-well cooking position and a surface-unit position and incorporating a temperature sensing unit that is operative to sense the temperature of a cooking vessel supported thereby in either cooking position thereof, which temperature sensing unit is employed to control, upon a temperature basis, selective heating of the heating unit.

Another object of the invention is to provide in an automatic cooking system of the character noted, a manually operable controller that is selectively operative to establish either the automatic temperature-controlled cooking operation governed by the temperature sensing unit or any one of a number of fixed electrical heating connections to the heating unit, which fixed heating connections are independent of the temperature sensing unit, whereby the cooking operations that are carried out in the combination cooking appliance may proceed in either cooking position thereof and upon either a basis of automatic temperature control or a basis of fixed heating rates.

A further object of the invention is to provide a combination cooking appliance of the character described, that is of improved construction and arrangement so that both the electric power supply connections and the control connections are entirely safe and of long life, notwithstanding the fundamental movements of the heating unit between its respective cooking positions and the additional movements of the temperature sensing unit with respect to the heating unit as required in the use of different cooking vessels supported by the heating unit.

A still further object of the invention is to provide a combination cooking appliance of the character noted that is of improved and simplified construction and arrangement.

Further features of the invention pertain to the particular arrangement of the elements of the automatic cooking system and of the combination cooking appliance incorporated therein.

The invention, both as to its organization and method of operation, together with further objects and advantages thereof, will best be understood by reference to the following specification taken in connection with the accompanying drawings, in which.

Figure 1:
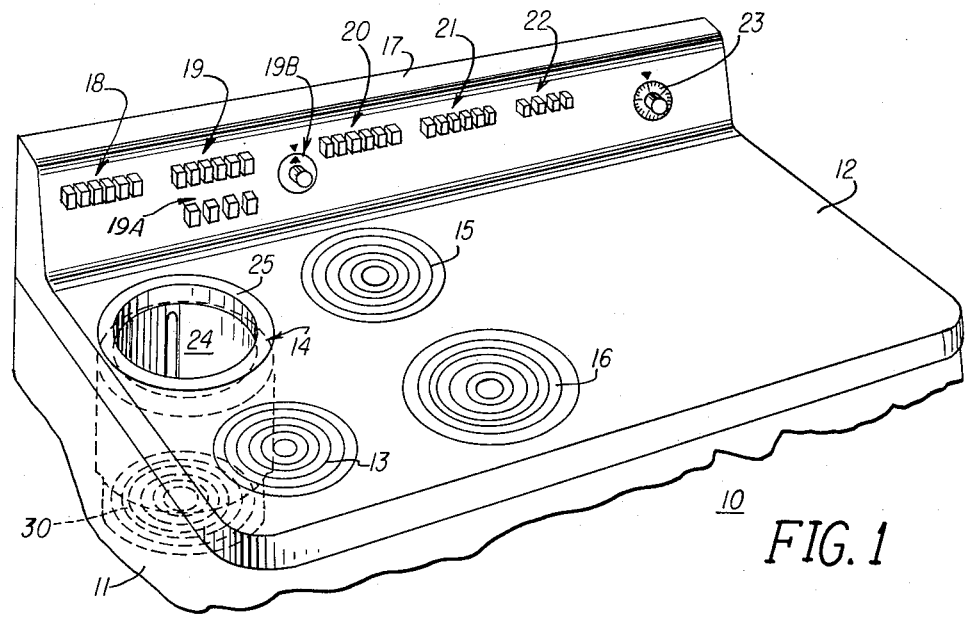
Figure 1 is a fragmentary front perspective view of the upper portion of an electric range incorporating an automatic cooking system and including a combination deep-well and surface-unit cooking appliance and embodying the present invention.

Referring now to Fig. 1 of the drawings, there is illustrated an electric range 10 incorporating an automatic cooking system including a combination deep-well and surface-unit cooking appliance and embodying the features of the present invention. The range 10 comprises an upstanding body 11 provided with a substantially horizontally disposed cooking top 12 supporting a plurality of surface-units or hotplate 13, 15 and 16, and the combination cooking appliance 14, the elements 13, 14, 15 and 16 being arranged in spaced-apart relation in a substantially rectangular pattern on the left-hand side of the cooking top 12. The body 11 also houses an oven, not shown, in the right-hand portion thereof, and a compartment, not shown, in the left-hand portion thereof, the oven and the compartment being provided with respective front doors, not shown. The cooking top 12 carries an upstanding backsplash 17 adjacent to the rear thereof that, in turn, carries a plurality of surface heating unit selector switches 18, 20 and 21, a special selector or control switch 19, a first pushbutton temperature controller 19A, a second rotary temperature controller 19B, an oven selector switch 22, and an oven regulator or thermostatic switch 23; the elements named being arranged generally in a row across the front of the backsplash 17. The selector switches 18, 20 and 21 respectively correspond to the surface heating units 13, 15 and 16, and are of conventional construction and are respectively included in the electric heating circuits thereof; while the special control switch 19 corresponds to the combination cooking appliance 14 of special construction and is included in the electric heating circuit of the heating unit thereof. Each of the surface heating unit selector switches 18, 20 and 21 is of the pushbutton type and is preferably of the construction of that disclosed in U. S. Patent No. 2,431,904, granted on December 2, 1947, to John L. Andrews; the special control switch 19 is of the pushbutton type and is of a modified form with respect to the construction disclosed in the Andrews patent mentioned, as explained more fully hereinafter; the pushbutton switch 22 is of the pushbutton type and is substantially of the construction disclosed in the Andrews patent; the pushbutton temperature controller 19A is of the pushbutton type and is of a modified form with respect to the construction disclosed in the Andrews patent, as explained more fully hereinafter; the rotary controller 21B is essentially of standard rotary construction; and the thermostatic switch 23 is of conventional construction.

The cooking top 12 has a plurality of openings therein that respectively receive the surface heating units 13, 15 and 16 and the combination cooking appliance 14. The surface heating unit 13, etc., may be fundamentally of the construction disclosed in U. S. Patent No. 2,563,443, granted on August 21, 1951, to Oliver G. Vogel and Francis E. Kirk; while the combination cooking appliance 14 is fundamentally of the construction disclosed in U. S. Patent No. 2,519,051, granted on August 15, 1950, to Francis E. Kirk.

Figure 2:
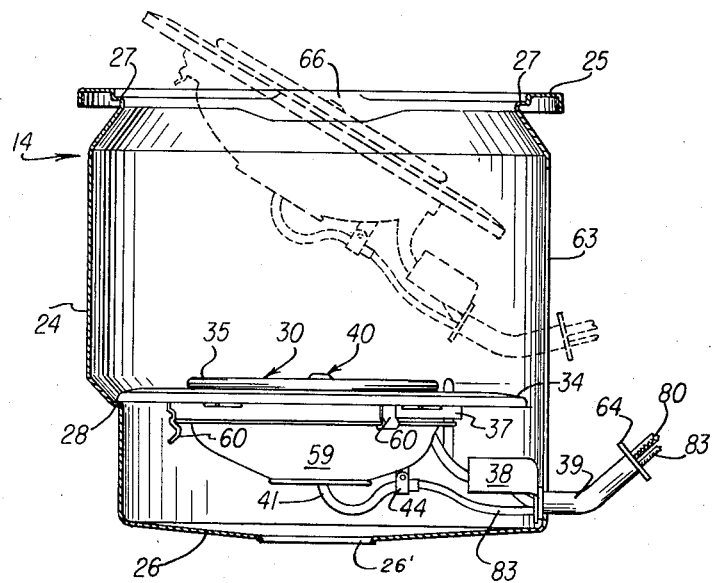
Fig. 2 is an enlarged side elevational view of the combination cooking appliance, illustrating in vertical section the receptacle thereof supporting the heating unit thereof in its deep-well position.
Figure 3:
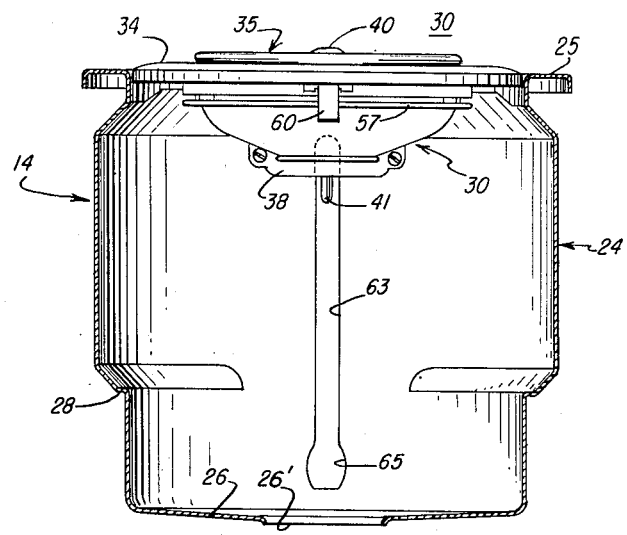
Fig. 3 is another enlarged side elevational view, similar to Fig. 2, of the combination cooking appliance, illustrating in vertical section the receptacle supporting the heating unit in its surface-unit position, this view being taken in the direction of the arrows along the line 3—3 in Fig. 2.
Figure 4:
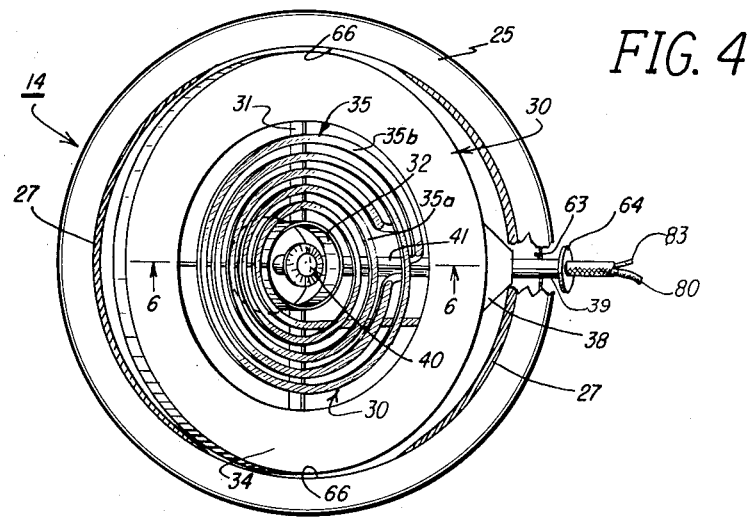
Fig. 4 is an enlarged plan view of the combination cooking appliance, illustrating the tilted or transition position of the heating unit that is required in order to effect movement thereof into or out of its surface-unit position, this transition position of the heating unit also being indicated in broken lines in Fig. 2.

Referring now more particularly to Figs. 2, 3 and 4, the combination cooking unit 14 comprises an upstanding generally cylindrical receptacle 24 terminating at the top thereof in an outwardly directed annular flange 25 and terminating at the bottom thereof in an inwardly directed bottom wall 26 having a centrally disposed drain opening 26' formed therein, the receptacle 24 being housed within the range body 11 and disposed below the corresponding left rear opening provided in the cooking top 12 and supported by the surrounding flange 25. The receptacle 24 is provided with an upper support 27 disposed inwardly with respect to the annular flange 25 and a lower support 28 disposed somewhat above the bottom wall 26, and houses an electric heating unit 30 that is movable between a lower deep-well cooking position, as shown in Fig. 2, and an upper surface-unit cooking position, as shown in Fig. 3.

As illustrated in Fig. 6, the unit 30 comprises an open spider 31 including a centrally disposed annular ring 32 and a number of radially extending arms 33, as well as a surrounding supporting or trim ring 34 that is arranged directly to engage the upper and lower supports 27 and 28 carried by the receptacle 24, as explained more fully hereinafter. In turn, the spider 31 carries a heating element 35 including respective inner and outer sections 35a and 35b. The heating element 35 is generally in the form of a helical coil or spiral, the turns of which are arranged in radially spaced-apart relation; and preferably the heating element 35 is of the metal sheath-helical resistance conductor type disclised in U. S. Patent No. 1,367,341, granted on February 1, 1921, to Charles C. Abbott. The top surfaces of the coils of the heating element 35 are flattened to define a substantially horizontal plane adapted to engage and to support the bottom wall of a cooking vessel, or the like, not shown. In the arrangement, the heating element 35 is disposed intermediate the central ring 32 and the outer ring 35, and the supporting platform thereof is positioned somewhat above the rings 32 and 34 so that the bottom wall of a supported cooking vessel engages only the coils of the heating element 35. The rear extremities of the inner and outer sections 35a and 35b of the heating element 35 extend downwardly and rearwardly with respect to the spider 31 and carry electrical power terminals 36, the terminal ends of the heating element 35 being suitably supported by an arm 37 carried by the spider 31. Also, the outer end of the arm 37 carries a terminal box 38 housing the power terminals 36 and carrying a rearwardly projecting tube 39 that accommodates electrical connections to the exterior of the heating unit 30, as explained more fully hereinafter.

Also the heating unit 30 comprises a temperature sensing unit 40 that includes a substantially L-shaped tube 41 provided with a rearwardly extending arm 42 and an upwardly extending arm 43 positioned below and in alignment with the central opening through the inner ring 32, the extreme rear end of the arm 42 being carried by a fixture 44, and the extreme top end of the arm 43 carrying a temperature sensing button 45. More particularly, the fixture 44 is arranged below the inner end of the arm 37 and somewhat forwardly and below the terminal box 38 and is directly carried by a depending arm 46. The upper end of the arm 46 and the inner end of the arm 37 are secured commonly to the adjacent rearwardly directed arm 33 of the spider 31 by rivets 47. Specifically, the lower end of the arm 46 terminates in a fixture 48 carrying an outwardly directed pivot pin 49 projecting through an opening provided in the upper portion of the fixture 44, whereby the fixture 44 is pivotally mounted upon the pivot pin 49, a spiral spring 50 being arranged between the pivot pin 49 and an outwardly projecting tab 51 carried at the top of the fixture 44 and biasing the fixture 44 in the clockwise direction, as viewed in Fig. 6. Further, an outwardly projecting stop 52 is carried by the fixture 48 in overhanging relation with the adjacent portion of the rear arm 42 and forwardly of the pivot pin 49, whereby the tube 41 is biased in the clockwise direction by the spring 50 in order to move the temperature sensing button 45 into an upper position disposed somewhat above the plane of the heating element 35. In the operation of the heating unit 30, it will be understood that when a cooking vessel is placed upon the heating platform of the heating element 35, the bottom wall thereof engages the button 45 moving the same into a lower position, the tube 41 being pivoted downwardly in the counterclockwise direction, as viewed in Fig. 6, about the pivot pin 49 and against the bias of the spring 50. Of course, when the supported cooking vessel is subsequently removed from the heating platform of the heating element 35, the sensing button is returned into its upper position by the action of the spring 50, the upper position thereof being established by the cooperation between the stop 52 and the adjacent portion of the rear arm 42 of the tube 41.

The sensing button 45 is of substantially disk-like structure, the central portion thereof terminating in an outwardly and downwardly directed surrounding flange that is rigidly secured to an annular part 53 terminating in a lower downwardly directed substantially semi-spherical socket 54 directly carried by an upwardly directed substantially semi-spherical ball 55 provided on the extreme upper end of the arm 43 of the tube 41; whereby the parts 55—54 constitute a ball and socket joint accommodating universal movements of the sensing button 45 with respect to the extreme upper end of the arm 43 so as to insure good thermal contact between the sensing button 45 and the bottom wall of a cooking vessel supported by the heating platform of the heating element 35, and notwithstanding irregularities therein or the particular configuration thereof. Hence, it will be understood that when a cooking vessel is placed upon the heating platform of the heating element 35, the pivotal connection between the fixtures 44 and 48 accommodates the downward movement of the tube 41, and the ball and socket connection 55—54 accommodates the universal movements between the sensing button 45 and the upper end of the arm 43 of the tube 41. The sensing button 45 is hollow and houses a temperature sensing element 56 arranged in good heat exchange relation with the central portion thereof, the sensing element 56 being movable with the sensing button 45. Preferably, the sensing element 56 is formed of "thermistor" material having a high negative coefficient of resistance; thermistor material consists essentially of sintered aluminum oxide and an oxide of magnesium, manganese, titanium, iron, nickel, cobalt, zinc, etc., and has a coefficient of resistance corresponding to a resistance rate of change of about: —0.044 ohm/ohm/°C. For example, the thermistor 56 may have a total resistance of 100,000 ohms at 25° C. and a total resistance of only 580 ohms at 200° C., the total resistance thereof changing very rapidly as the temperature thereof is elevated above the ambient temperature. The extreme outer end of the arm 42 carries control terminal structure 57 that is operatively connected to the thermistor 56 by electrical wiring 58 extending therebetween and through the tube 41. For example, the electrical wiring 56 may be formed of silver and may be covered with an insulating material capable of withstanding the relatively high temperatures involved, such, for example, as polytetrafluoroethylene, sold as "Teflon."

Finally, the heating unit 30 comprises a downwardly extending drip pan 59 disposed below the spider 31 and secured in place by a number of spring clips 60 carried by the outer ring 34, the lower central portion of the drip pan 59 having a drain opening 61 therein, and the upper rear portion of the drip pan 59 having a notch 62 therein. The drain opening 61 also accommodates the passage of the tube 41 therethrough and movement of the tube 41 without interference with the drip pan 59, while the notch 62 accommodates the passage therethrough of the arms 37 and 46 as well as the rearward extensions of the heating element 35. Thus it will be understood that the fixtures 44 and 48 and the associated parts are disposed below and exteriorly of the drip pan 59 rearwardly of the central opening 61, while the tube 41 projects through the opening 61, the upper arm 43 thereof being disposed within the confines of the drip pan 59 and below the spider 31. This arrangement accommodates ready placement and removal of the drip pan 59 by virtue of the resiliency of the spring clips 60; and in passing, it is noted that the tube 41 may be moved downwardly about the pivot pin 49 through a considerable angle in order to accommodate the ultimate disengagement of the drip pan 59 and the complete removal thereof from the heating unit 30. Of course, the replacement of the drip pan 59 is effected in a reverse manner; and in passing, it is noted that the drip pan 59 also serves the reflector function causing the downwardly directed heat from the heating unit 35 to be reflected back upwardly onto the bottom wall of the supported cooking vessel.

The heating unit 30 has a lower deep-well cooking position illustrated in Fig. 2, wherein it is supported in place by engagement of the outer ring 34 with the lower support 28; and the heating unit 30 has an upper surface unit cooking position illustrated in Fig. 3, wherein it is supported in place by engagement of the outer ring 34 with the upper support 27; guided movement of the heating unit 30 between its respective cooking positions is accommodated by an upstanding slot 63 formed in the receptacle 24 and receiving the tube 39 projecting rearwardly from the terminal housing 38. Specifically, the extreme rear end of the tube 39 carries an outwardly directed annular flange 64 that is somewhat larger in diameter than the width of the major and upper portion of the slot 63, so as to prevent total disengagement of the heating unit 30 with respect to the receptacle 24; however, a connecting opening 65 is formed in the receptacle 24 and joining the extreme lower end of the slot 63 so as to accommodate the passage therethrough of the annular flange 64 and the consequent total disengagement of the heating unit 30 with respect to the receptacle 24.

As best shown in Fig. 4, the upper support 27 comprises respective front and rear sections so as to provide a pair of intermediate cutouts or notches 66 therethrough that are spaced laterally apart a distance somewhat greater than the diameter of the outer ring 34 so as to accommodate passage of the heating unit 30 in a tilted position into and out of its upper surface-unit position, as illustrated in Fig. 4 and as indicated by the broken lines in Fig. 2. Specifically, when the heating unit 30 is moved from its deep-well cooking position of Fig. 2 into its surface heating cooking position of Fig. 3, it is tilted upwardly in the general manner indicated in Fig. 2 so that the ring 34 may pass through the notches 66 provided in the upper support 27 as the heating unit 30 is lifted therethrough; and subsequently the heating unit 30 is returned downwardly back into a stable and subsequently horizontal position so that the front and rear portions of the ring 34 respectively engage the front and rear portions of the upper support 27, whereby the heating unit 30 occupies its surface-unit cooking position shown in Fig. 3. Of course, it will be understood that the return of the heating unit 30 from its upper surface-unit cooking position of Fig. 3 back into its lower deep-well cooking position of Fig. 2 is accomplished in a reverse manner by tilting, as illustrated in Fig. 4, followed by lowering onto the lower support 28.

Figure 5:
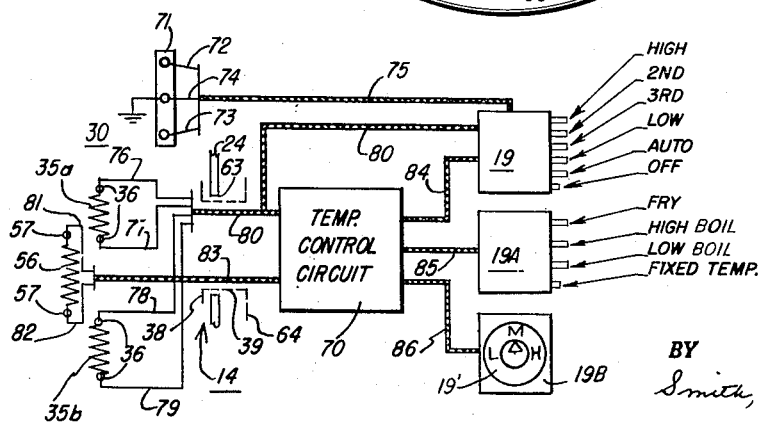
Fig. 5 is an electrical diagram of the automatic cooking system that is incorporated in the electric range of Fig. 1, and including the combination cooking appliance of Figs. 2 to 4, inclusive; and, Fig. 6 is a greatly enlarged fragmentary vertical sectional view of the heating unit, taken in the direction of the arrows along the line 6—6 in Fig. 4.

Finally, the combination appliance 14 comprises an electric control circuit diagrammatically illustrated in Fig. 5; which control circuit is preferably connected and arranged in the manner disclosed in the copending application of Robert J. Molyneaux, Serial No. 521,666, filed July 13, 1955; which control circuit comprises a 3-wire Edison source of power supply of 236-volts, single-phase, 60 cycles, A. C., the pushbutton switch 19, the pushbutton controller 19A, the rotary controller 19B and a temperature control circuit, indicated generally at 70. More particularly, the range 10 comprises a terminal block 71 terminating the two outside conductors 72 and 73 and the grounded neutral conductor 74 of the power source; which conductors are connected by a supply cable 75 to the pushbutton switch 19. The pair of power terminals 36 respectively terminating the offset ends of the inner heating element section 35a are connected to two conductors 76 and 77; while the pair of power terminals 36 respectively terminating the offset ends of the outer heating element section 35b are respectively connected to two conductors 78 and 79; which conductors 76, 77, 78 and 79 comprise a power cable 80 extending from the heating unit 30 through the tube 39 to the exterior of the combination appliance 14 and ultimately both to the pushbutton switch 19 and to the temperature control circuit 70. The pair of control terminals 57 terminating the electric wiring 58 extending to the respective terminals of the thermistor 56 are respectively connected to two conductors 81 and 82 comprising a control cable 83 extending from the heating unit 30 through the tube 39 to the exterior and ultimately to the temperature control circuit 70. In the arrangement, the power cable 80 and the control cable 83 comprise flexible cables so as to accommodate the movements of the heating unit 30 between its respective heating positions. The pushbutton switch 19 is also connected via a control cable 84 to the temperature control circuit 70; while the pushbutton controller 19A and the rotary controller 19B are respectively connected by two control cables 85 and 86 to the control circuit 70.

In the arrangement, the pushbutton switch 19 comprises six individual pushbuttons respectively designated: "high," "2nd," "3rd," "low," "auto" (abbreviation for automatic) and "off," as well as interlock mechanism responsive to operation or depression of any one of the pushbuttons out of its normal position for returning the prior last-operated one of the pushbuttons back into its normal projected position. The pushbutton controller 19A comprises four individual pushbuttons respectively designated: "fry," "high boil," "low boil" and "fixed temp," as well as interlock mechanism responsive to operation or depression of any one of the pushbuttons out of its normal position for returning the prior last-operated one of the pushbuttons back into its normal projected position. The rotary controller 19B comprises a manually rotatable dial 10' having "low," "medium" and "high" positions in its continuous range of operation.

Considering now the mode of operation of the combination appliance 14, it is pointed out that it is operated in an identical manner in each of its respective cooking positions and may be selectively controlled either to produce a series of fixed heating rates or to maintain a predetermined temperature of the bottom wall of a cooking vessel supported by the heating unit 30. Specifically, when the off pushbutton of the pushbutton switch 19 occupies its operated position, the supply cable 75 is disconnected from the power cable 80 and from the control cable 84; whereby the heating unit 35 is deenergized and the control circuit 70 is rendered inactive. When the high, 2nd, 3rd and low pushbuttons of the pushbutton switch 19 are respectively operated, respective fixed electrical heating connections are established between the supply cable 85 and the power cable 80 and thus to the heating unit 30 so as to effect heating thereof at the four respective fixed heating rates. More particularly, in the high position of the pushbutton switch 19, the inner and outer sections 35a and 35b are connected in parallel relation across the outside lines 72 and 73 of the power source to complete the high heating connection entirely independent of the temperature control circuit 70; in the 2nd position of the pushbutton switch 19, the inner section 35a is connected across the outside lines 72 and 73 of the power source to complete the 2nd heating connection entirely independent of the temperature control circuit 70; in the 3rd position of the pushbutton switch 19, the inner and outer sections 35a and 35b are connected in parallel relation across the outside line 72 and the neutral line 74 to complete the third heating connection entirely independent of the temperature control circuit 70; and in the low position of the pushbutton switch 19, the inner section 35a is connected across the outside line and the neutral line 74 of the power source to complete the low heating connection entirely independent of the temperature control circuit 70.

When the automatic pushbutton of the pushbutton switch 19 occupies its operated position, the supply cable 75 is connected to the control cable 84, whereby the temperature control circuit 70 is rendered active and the heating of the heating unit 30 is governed entirely by the temperature control unit 70 and based upon the temperature of the thermistor 56 and the adjusted positions of the pushbutton controller 19A and the rotary controller 19B, as explained more fully below.

First assuming that the fixed temperature pushbutton of the pushbutton controller 19A occupies its operated position, a resistance network, not shown, in the temperature control circuit 70 is set entirely by the pushbutton controller 19A and cooperates with the thermistor 56 to govern the temperature control circuit 70 so as to effect selective energization of the heating unit 30 so that the bottom wall of the supported cooking vessel is maintained at a temperature in the approximate range $160° F. \pm 5° F.$, the rotary controller 19B being disabled at this time.

Now assuming that the low boil pushbutton of the pushbutton controller 19A occupies its operated position, the resistance network, not shown, in the temperature control circuit 70 is set jointly by the pushbutton controller 19A and by the rotary controller 19B and cooperate with the thermistor 56 to govern the temperature control circuit 70 so as to effect selective energization of the heating unit 30 so that the bottom wall of the supported cooking vessel is maintained at a temperature in the approximate range 200° F.–215° F., the rotary controller 19B being enabled and selectively operative to effect the 15° F. modification of the temperature band within the low boil temperature range noted fundamentally established by the pushbutton controller 19A.

Next assuming that the high boil pushbutton of the pushbutton controller 19A occupies its operated position, a resistance network, not shown, in the temperature control circuit 70 is set jointly by the pushbutton controller 19A and by the rotary controller 19B and cooperate with the thermistor 56 to govern the temperature control circuit 70 so as to effect selective energization of the heating unit 30 so that the bottom wall of the supported cooking vessel is maintained at a temperature in the approximate range 210° F.–230° F., the rotary controller 19B being enabled and selectively operative to effect the 20° F. modification of the temperature band within the high boil temperature range noted fundamentally established by the pushbutton controller 19A.

Finally assuming that the fry pushbutton of the pushbutton controller 19A occupies its operated position, the resistance network, not shown, in the temperature control circuit 70 is set jointly by the pushbutton controller 19A and the rotary controller 19B and cooperate with the thermistor 56 to govern the temperature control circuit 70 so as to effect selective energization of the heating unit 30 so that the bottom wall of the supported cooking vessel is maintained at a temperature in the approximate range 230° F.–425° F., the rotary controller 19B being enabled and selectively operative to effect the 195° F. modification of the temperature band within the fry temperature range noted fundamentally established by the pushbutton controller 19A.

As previously explained, the foregoing fixed heating rate controls and selective temperature controls are selectively set by the selective operations of the pushbutton switch 19, the pushbutton controller 19A and the rotary controller 19B, independently of the cooking position of the heating unit 30 in the combination appliance 14; whereby these selective heating and temperature controls may be achieved either in deep-well cooking operations or in surface-unit cooking operations in the combination appliance 14.

As indicated in Figs. 2, 5 and 6, the flexible power cable 80 and the flexible control cable 83 extending through the tube 39 respectively to the power terminals 36 and to the control terminals 57 accommodate the required movements of the heating unit 30 in the receptacle 24 between its respective lower deep-well cooking position and upper surface-unit cooking position; and moreover, the flexible control cable 83 also accommodates the movements of the temperature sensing unit 40 between its lower and upper positions, and the consequent pivoting of the tube 41 respectively in response to placement and to removal of a cooking vessel upon the heating platform of the heating element 35, when the heating unit 30 occupies either of its respective cooking positions. Finally, the flexible wiring 58 accommodates the universal movements of the temperature sensing button 45 upon the upper end of the arm 43 of the tube 41.

In view of the foregoing, it is apparent that there has been provided an improved cooking system employing a combination deep-well and surface-unit cooking appliance, wherein complete flexibility of selective heating and temperature control is preserved in the respective cooking operations thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a combination deep-well and surface-unit cooking appliance including an upstanding receptacle provided with lower and upper supports, and a hotplate provided with an electric heating unit and arranged in said receptacle and movable between a deep-well cooking position carried by said lower support and a surface-unit cooking position carried by said upper support and defining a heating platform adapted to support a cooking vessel in good heat-exchange relation therewith in the respective cooking positions thereof; the combination comprising a temperature sensing unit provided with a temperature-controlled element, resilient means mounting said temperature sensing unit upon said hotplate and in a substantially central opening provided therethrough, whereby said temperature sensing unit is movable both with said hotplate and with respect thereto, said resilient means biasing said temperature sensing unit into an upper position in which the top thereof is disposed somewhat above the plane of said heating platform and accommodating movement of said temperature sensing unit into a lower position in which the top thereof is disposed substantially in the plane of said heating platform, said temperature sensing unit being moved into its respective lower and upper positions in response to respective placement and removal of a cooking vessel with respect to said heating platform so that said temperature sensing unit is urged into good heat-exchange engagement with the bottom of a cooking vessel supported upon said heating platform when said hotplate occupies either of its cooking positions, a flexible power connector extending through an opening in said receptacle and terminated by said electric heating unit and accommodating the movements of said hotplate between its respective cooking positions, and a flexible control connector also extending through an opening in said receptacle and terminated by said temperature-controlled element and accommodating both the movements of said hotplate between its respective cooking positions and the movements of said temperature sensing unit between its respective upper and lower positions.

2. In a combination deep-well and surface-unit cooking appliance including an upstanding receptacle provided with lower and upper supports, and a hotplate provided with an electric heating unit and arranged in said receptacle and movable between a deep-well cooking position carried by said lower support and a surface-unit cooking position carried by said upper support and defining a heating platform adapted to support a cooking vessel in good heat-exchange relation therewith in the respective cooking positions thereof; the combination comprising a temperature sensing unit provided with a temperature-controlled element, resilient means mounting said temperature sensing unit upon said hotplate and in a substantially central opening provided therethrough, whereby said temperature sensing unit is movable both with said hotplate and with respect thereto, said resilient means biasing said temperature sensing unit into an upper position in which the top thereof is disposed somewhat above the plane of said heating platform and accommodating movement of said temperature sensing unit into a lower position in which the top thereof is disposed substantially in the plane of said heating platform, said temperature sensing unit being moved into its respective lower and upper positions in response to respective placement and removal of a cooking vessel with respect to said heating platform so that said temperature sensing unit is urged into good heat-exchange engagement with the bottom of a cooking vessel supported upon said heating platform when said hotplate occupies either of its cooking positions, a tubular guard member carried by said hotplate and extending through an upstanding slot provided in said receptacle and movable with said hotplate between its respective cooking positions, a flexible power connector extending through said guard member and terminated by said electric heating unit and accommodating the movements of said hotplate between its respective cooking positions, and a flexible control connector also extruding through said guard member and terminated by said temperature-controlled element and accommodating both the movements of said hotplate between its respective cooking positions and the movements of said temperature sensing unit between its respective upper and lower positions.

3. In a combination deep-well and surface-unit cooking appliance including an upstanding receptacle provided with lower and upper supports, and a hotplate provided with an electric heating unit and arranged in said receptacle and movable between a deep-well cooking position carried by said lower support and a surface-unit cooking position carried by said upper support and defining a heating platform adapted to support a cooking vessel in good heat-exchange relation therewith in the respective cooking positions thereof; the combination comprising a temperature sensing unit provided with a thermistor, resilient means mounting said temperature sensing unit upon said hotplate and in a substantially central opening provided therethrough, whereby said temperature sensing unit is movable both with said hotplate and with respect thereto, said resilient means biasing said temperature sensing unit into an upper position in which the top thereof is disposed somewhat above the plane of said heating platform and accommodating movement of said temperature sensing unit into a lower position in which the top thereof is disposed substantially in the plane of said heating platform, said temperature sensing unit being moved into its respective lower and upper positions in response to respective placement and removal of a cooking vessel with respect to said heating platform so that said temperature sensing unit is urged into good heat-exchange engagement with the bottom of a cooking vessel supported upon said heating platform when said hotplate occupies either of its cooking positions, a flexible power connector extending through an opening in said receptacle and terminated by said electric heating unit and accommodating the movements of said hotplate between its respective cooking positions, and a flexible control connector also extending through an opening in said receptacle and terminated by said thermistor and accommodating both the movements of said hotplate between its respective cooking positions and the movements of said temperature sensing unit between its respective upper and lower positions.

4. In a cooking appliance, a hotplate provided with an electric heating unit and defining a heating platform adapted to support a cooking vessel in good heat-exchange relation therewith and having a substantial central opening therethrough, an arm arranged below said heating unit and provided with an outwardly directed outer end and an upwardly directed inner end terminating below said central opening, first means mounting the outer end of said arm upon said hotplate for pivoted movements with respect thereto, a temperature sensing unit provided with a temperature-controlled element and arranged in said central opening, second means mounting said temperature sensing unit upon the inner end of said arm for universal movements with respect thereto, said first mounting means accommodating pivotal movement of said arm between a lower position in which the top of said temperature sensing unit is disposed substantially in the plane of said heating platform and an upper position in which the top of said temperature sensing unit is disposed somewhat above the plane of said heating platform, biasing means for urging said arm upwardly from its lower position into its upper position, said arm being moved against said biasing means from its upper position into its lower position in response to placement of a cooking vessel upon said heating platform, said biasing means effecting the return of said arm from its lower position into its upper position in response to removal of a cooking vessel from said heating platform, stop means for limiting upward movement of said arm beyond its upper position, said second mounting means accommodating any required movements between said temperature sensing unit and the inner end of said arm to adjust the top of said temperature sensing unit into good heat-exchange engagement with the bottom of a cooking vessel supported upon said heating platform, and a flexible control connector extending from said temperature-controlled element to the exterior and accommodating both the movements of said arm between its upper and lower positions and the movements of said temperature sensing unit with respect to the inner end of said arm.

5. The cooking appliance set forth in claim 4, wherein said arm is of tubular structure, and said flexible control connector extends through said tubular arm between said temperature-controlled element and the exterior.

6. The cooking appliance set forth in claim 4, wherein said second mounting means consists essentially of cooperating ball and socket parts, one of said parts being carried on the inner end of said arm, and the other of said parts being carried on the bottom of said temperature sensing unit.

7. In a cooking appliance, an electric heating unit including a plurality of spaced apart substantially spiral turns defining a heating platform adapted to support a cooking vessel in good heat-exchange relation therewith, the innermost turn of said heating unit also defining a substantially central opening therethrough, open supporting structure carrying said heating unit, an arm arranged below said heating unit and provided with an outwardly directed outer end and an upwardly directed inner end terminating below said central opening, first means mounting the outer end of said arm upon said supporting structure for pivotal movements with respect thereto, a temperature sensing unit provided with a temperature-controlled element and arranged in said central opening, second means mounting said temperature sensing unit upon the inner end of said arm for universal movements with respect thereto, said first mounting means accommodating pivotal movement of said arm between a lower position in which the top of said temperature sensing unit is disposed substantially in the plane of said heating platform and an upper position in which the top of said temperature sensing unit is disposed somewhat above the plane of said heating platform, biasing means acting between said arm and said supporting structure for urging said arm upwardly from its lower position into its upper position, said arm being moved against said biasing means from its upper position into its lower position in response to placement of a cooking vessel upon said heating platform, said biasing means effecting the return of said arm from its lower position into its upper position in response to removal of a cooking vessel from said heating platform, stop means acting between said arm and said supporting structure for limiting upward movement of said arm beyond its upper position, said second mounting means accommodating any required movements between said temperature sensing unit and the inner end of said arm to adjust the top of said temperature sensing unit into good heat-exchange engagement with the bottom of a cooking vessel supported upon said heating platform, and a flexible control connector extending from said temperature-controlled element to the exterior and accommodating both the movements of said arm between its upper and lower positions and the movements of said temperature sensing unit with respect to the inner end of said arm.

8. In a cooking appliance, a hotplate provided with an electric heating unit and defining a heating platform adapted to support a cooking vessel in good heat-exchange relation therewith and having a substantially central opening therethrough, an arm arranged below said heating unit and provided with an outwardly directed outer end and an upwardly directed inner end terminating below said central opening, first means mounting the outer end of said arm upon said hotplate for pivotal movements with respect thereto, a temperature sensing unit provided with a thermostor and arranged in said central opening, second means mounting said temperature sensing unit upon the inner end of said arm for universal movements with respect thereto, said first mounting means accommodating pivotal movement of said arm between a lower position in which the top of said temperature sensing unit is disposed substantially in the plane of said heating platform and an upper position in which the top of said temperature sensing unit is disposed somewhat above the plane of said heating platform, biasing means for urging said arm upwardly from its lower position into its upper position, said arm being moved against said biasing means from its upper position into its lower position in response to placement of a cooking vessel upon said heating platform, said biasing means effecting the return of said arm from its lower position into its upper position in response to removal of a cooking vessel from said heating platform, stop means for limiting upward movement of said arm beyond its upper position, said second mounting means accommodating any required movements between said temperature sensing unit and the inner end of said arm to adjust the top of said temperature sensing unit into good heat-exchange engagement with the bottom of a cooking vessel supported upon said heating platform, said arm being of tubular structure, and a flexible control connector extending through said tubular arm from said thermistor to the exterior and accommodating both the movements of said tubular arm between its upper and lower positions and the movements of said temperature sensing unit with respect to the inner end of said arm.

9. In a combination deep-well and surface unit cooking appliance including an upstanding receptacle provided with lower and upper supports, and a hotplate provided with an electric heating unit and arranged in said receptacle and movable between a deep-well cooking position carried by said lower support and a surface-unit cooking position carried by said upper support and defining a heating platform adapted to support a cooking vessel in good heat-exchange relation therewith in the respective cooking positions thereof; the combination comprising an arm arranged below said heating unit and provided with an outwardly directed outer end and an upwardly directed inner end terminating below said central opening, first means mounting the outer end of said arm upon said hotplate for pivotal movements with respect thereto, a temperature sensing unit provided with a temperature-controlled element and arranged in said central opening, second means mounting said temperature sensing unit upon the inner end of said arm for universal movements with respect thereto, said first mounting accommodating pivotal movement of said arm between a lower position in which the top of said temperature sensing unit is disposed substantially in the plane of said heating platform and an upper position in which the top of said temperature sensing unit is disposed somewhat above the plane of said heating platform, biasing means for urging said arm upwardly from its lower position into its upper position, said arm being moved against said biasing means from its upper position into its lower position in response to placement of a cooking vessel upon said heating platform when said hotplate occupies either of its cooking positions, said biasing means effecting the return of said arm from its lower position into its upper position in response to removal of a cooking vessel from said heating platform when said hotplate occupies either of its cooking positions, stop means for limiting upward movement of said arm beyond its upper position, said second mounting means accommodating any required movements between said temperature sensing unit and the inner end of said arm to adjust the top of said temperature sensing unit into good heat-exchange engagement with the bottom of a cooking vessel supported upon said heating platform when said hotplate occupies either of its cooking positions, a flexible power connector extending through an opening in said receptacle and terminated by said electric heating unit and accommodating the movements of said hotplate between its respective cooking positions, and a flexible control connector also extending through an opening in said receptacle and terminated by said temperature-controlled element and accommodating both the movements of said hotplate between its respective cooking positions and the movements of said temperature sensing unit between its respective upper and lower positions as well as the movements of said temperature sensing unit with respect to the inner end of said arm.

10. In an electric range, a combination deep-well and surface-unit appliance including a heating unit selectively movable into corresponding cooking positions, said heating unit being adapted to support a cooking vessel in good heat-exchange relation therewith in the respective cooking positions thereof and including a temperature sensing unit adapted to sense the temperature of the bottom of the supported cooking vessel, a source of electric power, automatic control equipment, a supply connection extending between said automatic control equipment and said heating unit, a flexible control connector extending between said temperature sensing unit and said automatic control equipment and accommodating the movements of said heating unit between its respective cooking positions, a manually operable circuit controller having a plurality of control positions and an automatic position and an off position, said circuit controller being operative into respective ones of its plurality of control positions to complete a corresponding plurality of different heating connections directly between said source and said heating unit independently of said automatic control equipment, said circuit controller being operative into its automatic position to complete a feed connection from said source to said automatic control equipment, said circuit controller being operative into its off position to interrupt both each of said heating connections and said feed connection, said automatic control equipment being operative in response to the completion of said feed connection thereto selectively to complete said supply connection, and a manually operable temperature controller selectively settable in accordance with the desired temperature of a cooking vessel supported by said heating unit, said automatic control equipment being governed jointly by said temperature sensing unit and by said temperature controller in its operation selectively to complete said supply connection so as to maintain the preset desired temperature of the cooking vessel supported by said heating unit, said heating connections and said supply connection including a common flexible power cable accommodating the movements of said heating unit between its respective cooking positions.

References Cited in the file of this patent

UNITED STATES PATENTS

| | | |
|---|---|---|
| 2,430,196 | Vaughan | Nov. 4, 1947 |
| 2,519,051 | Kirk | Aug. 15, 1950 |
| 2,534,097 | Akeley | Dec. 12, 1950 |